(12) United States Patent
Tsai et al.

(10) Patent No.: US 11,312,474 B2
(45) Date of Patent: Apr. 26, 2022

(54) FLAP ACTUATION SYSTEM WITH SUPPORT CATCHER LINK

(71) Applicant: The Boeing Company, Chicago, IL (US)

(72) Inventors: Kevin R. Tsai, Seattle, WA (US); Miranda Peterson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 509 days.

(21) Appl. No.: 16/441,426

(22) Filed: Jun. 14, 2019

(65) Prior Publication Data

US 2020/0391845 A1 Dec. 17, 2020

(51) Int. Cl.
*B64C 9/02* (2006.01)
*B64C 9/18* (2006.01)

(52) U.S. Cl.
CPC . *B64C 9/02* (2013.01); *B64C 9/18* (2013.01)

(58) Field of Classification Search
CPC .... B64C 9/02; B64C 9/16; B64C 9/18; B64C 9/20
See application file for complete search history.

(56) References Cited

U.S. PATENT DOCUMENTS

| 4,172,575 | A | * | 10/1979 | Cole | B64C 9/16 244/216 |
|---|---|---|---|---|---|
| 4,995,575 | A | * | 2/1991 | Stephenson | B64C 9/16 244/216 |
| 2005/0040294 | A1 | * | 2/2005 | Perez-Sanchez | B64C 9/16 244/215 |
| 2018/0065731 | A1 | * | 3/2018 | Berthoud | B64C 9/02 |
| 2018/0290726 | A1 | * | 10/2018 | Sun | B64C 9/22 |

* cited by examiner

*Primary Examiner* — Joshua J Michener
*Assistant Examiner* — Arfan Y. Sinaki
(74) *Attorney, Agent, or Firm* — Felix L. Fischer

(57) ABSTRACT

A flap actuation system employed in an aircraft wing with a flap having an internal structure employs a drive link pivotally attached at a top end with a drive axle to a forward lug on the internal structure and pivotally attached at a bottom end with a first pivot axle to a flap support element. An actuator is operably coupled to the drive link intermediate the top end and bottom end. A trailing link is pivotally attached at a leading end with a second pivot axle to the flap support element and pivotally attached at a trailing end with a reaction axle to an aft fitting on the internal structure. A catcher link is pivotally attached at a bottom end to the flap support element and at a top end to an intermediate fitting engaged to the internal structure. The catcher link is unloaded in a typical operating condition and upon a failure in the drive link, first pivot axle, drive axle, forward lug, trailing link, second pivot axle, reaction axle or aft fitting a load is induced on the catcher link to accommodate the failure condition.

20 Claims, 14 Drawing Sheets

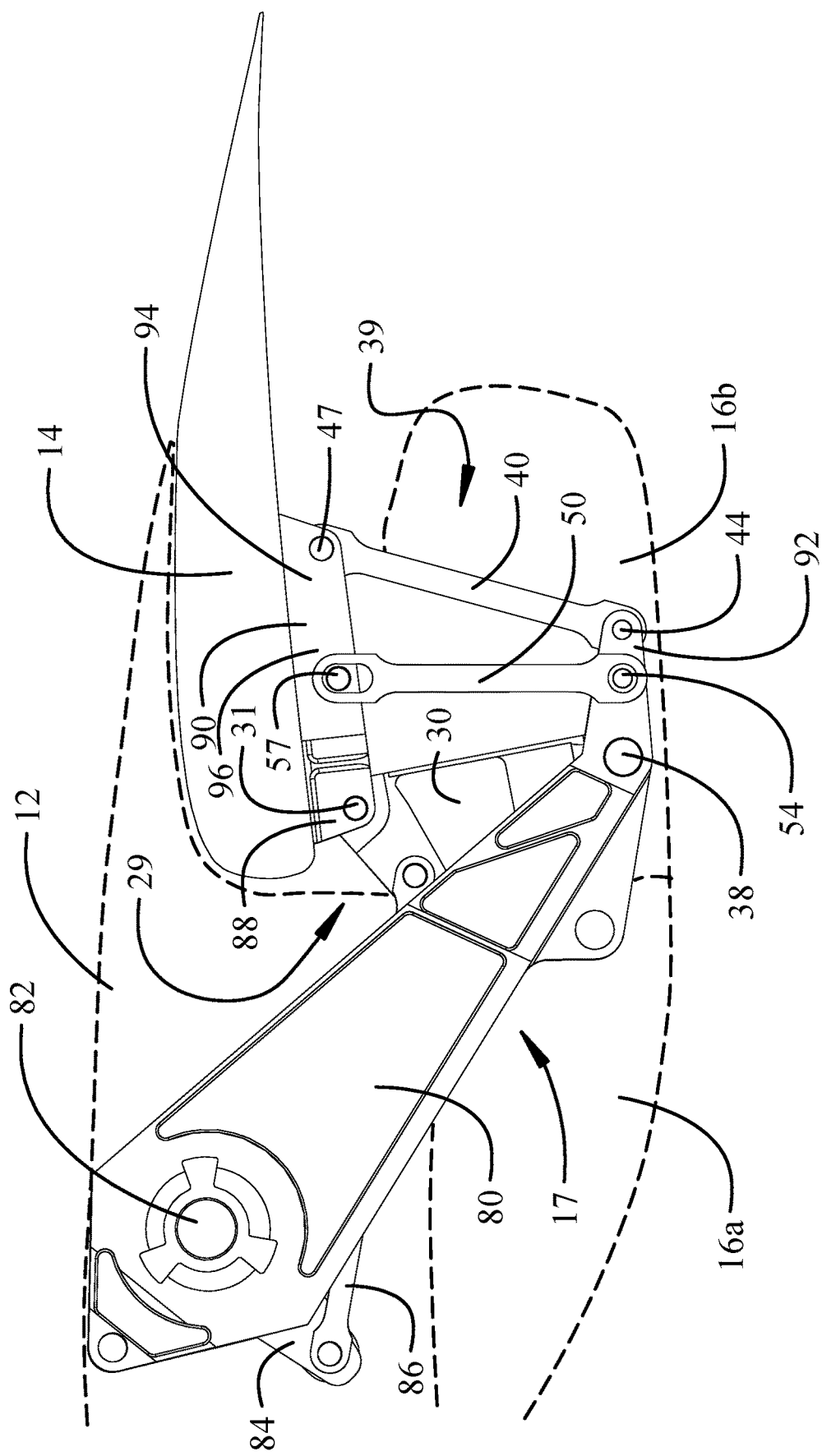

FLAP ACTUATION SYSTEM WITH SUPPORT CATCHER LINK

BACKGROUND INFORMATION

Field

This disclosure relates generally to the field of aircraft flap extension systems and, more particularly to a flap actuation system having a drive link and a trailing link with an intermediate catcher link receiving load in response to a failure.

BACKGROUND

Aircraft employ flaps which increase camber of the wings for enhanced aerodynamic efficiency in take-off and landing. Various mechanical arrangements have been developed to deploy the flaps from retracted to extended positions. Due to fault tolerance requirements, structural elements of the flap actuation system must employ redundant load paths in the same structure. Pin inside of a pin element for pivoting connections and complementary parts fastened together to create structural elements for flap drive and trailing links are typically used to provide these redundant load paths. This requires a high part count, complex assembly and an increased aircraft weight.

SUMMARY

Exemplary implementations of the flap actuation system are employed in an aircraft wing with a flap having an internal structure. A drive link is pivotally attached at a top end with a drive axle to a forward lug on the internal structure and pivotally attached at a bottom end with a first pivot axle to a flap support element An actuator is operably coupled to the drive link intermediate the top end and bottom end. A trailing link is pivotally attached at a leading end with a second pivot axle to the flap support element and pivotally attached at a trailing end with a reaction axle to an aft fitting on the internal structure. A catcher link is pivotally attached at a bottom end to the flap support element and at a top end to an intermediate fitting engaged to the internal structure. The catcher link is unloaded in a typical operating condition and upon a failure in the drive link, first pivot axle, drive axle, forward lug, trailing link, second pivot axle, reaction axle or aft fitting a load is induced on the catcher link to accommodate the failure condition.

The implementations herein provide a method for mitigating a failure in a flap actuation structure. A drive link is attached between a flap internal structure and an underwing beam and an actuator is coupled to the drive link. A trailing link is attached to the underwing beam and the flap internal structure. A catcher link is attached at a bottom end to the underwing beam and at a top end to an intermediate fitting engaged to the flap internal structure. The catcher link is maintained unloaded in a normal operating condition and upon a failure associated with the drive link or trailing link, a load is induced on the catcher link for failure mitigation.

BRIEF DESCRIPTION OF THE DRAWINGS

The features, functions, and advantages that have been discussed can be achieved independently in various examples of the present disclosure or may be combined in yet other examples further details of which can be seen with reference to the following description and drawings.

FIG. 5 is a side view of a second example implementation of the flap actuation system;

DETAILED DESCRIPTION

The implementations described herein provide a catcher link intermediate a drive assembly and a load reaction assembly in a flap actuation system for an aircraft wing flap. The catcher link remains unloaded during typical operation of the flap actuation system. Upon a failure in the drive assembly or load reaction assembly, load is induced on the catcher link which mitigates the failure maintaining the flap in a safe condition.

Figure 1A:
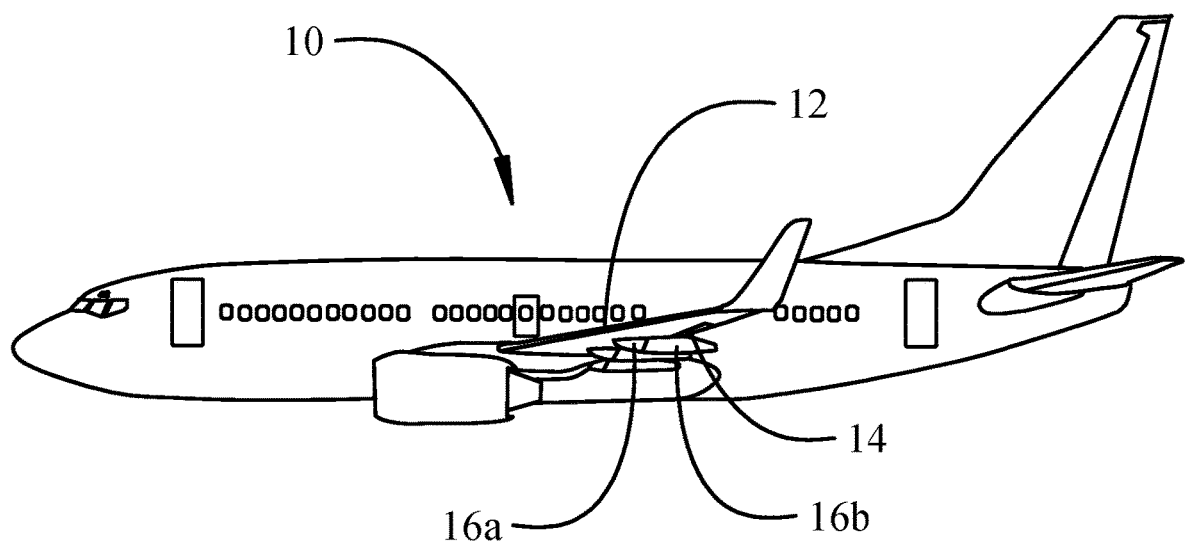
FIG. 1A is a representation of an aircraft in which the implementations disclosed herein may be employed.
Figure 1B:
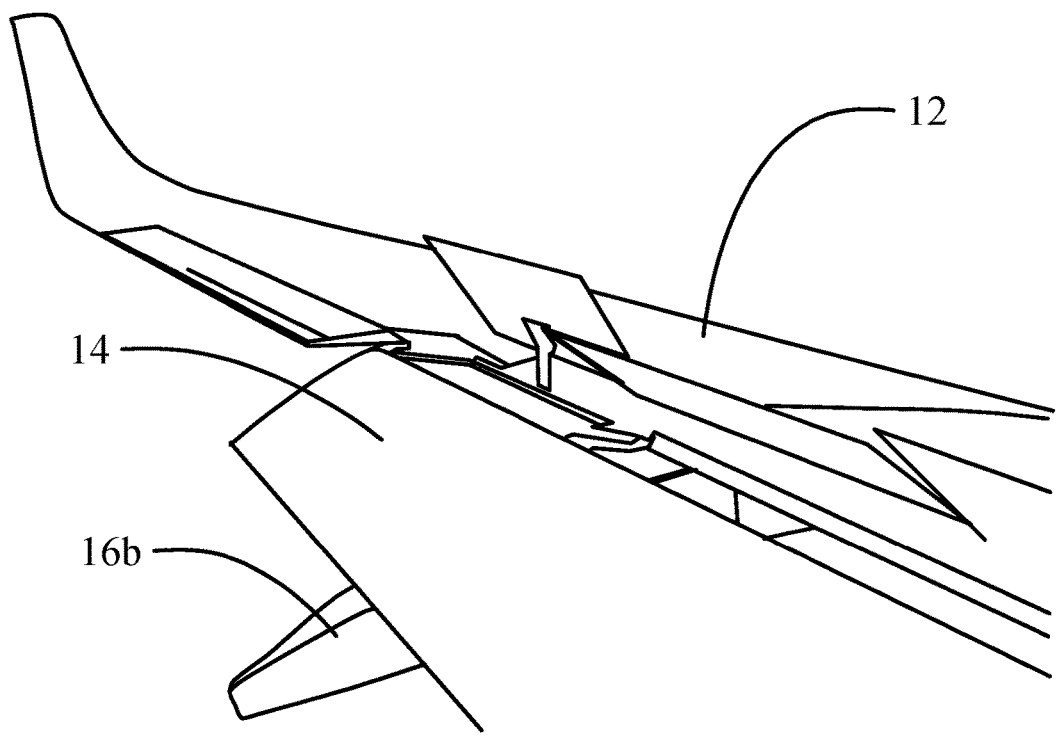
FIG. 1B is a detailed pictorial representation of the wing and flap of the aircraft of FIG. 1A.
Figure 1C:
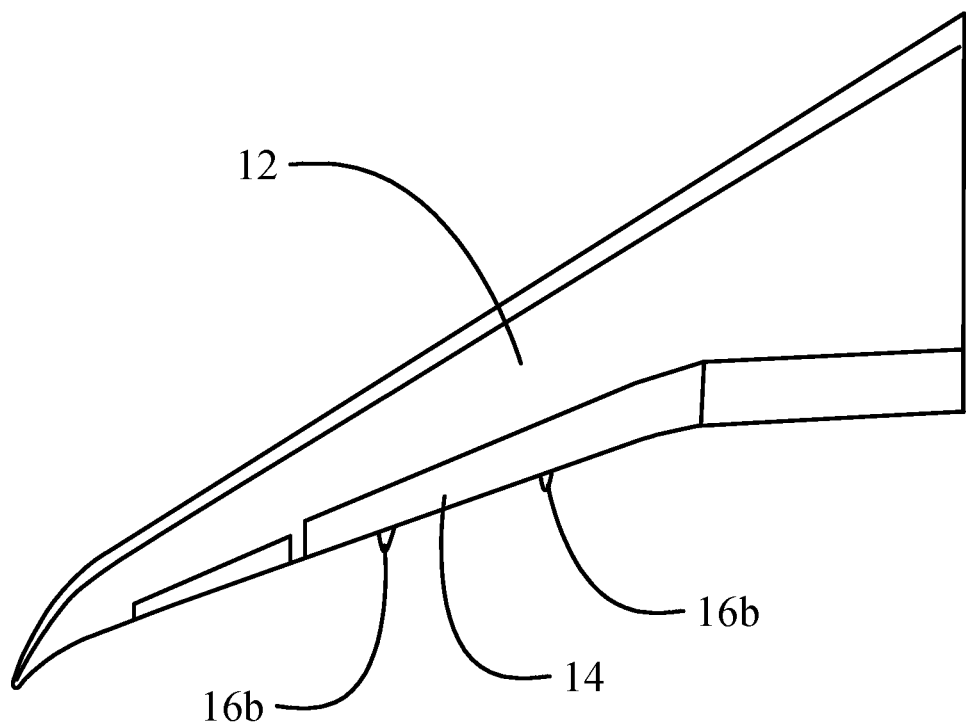
FIG. 1C is a top view of the wing and flaps of FIG. 1B.

Referring to the drawings, FIGS. 1A, 1B and 1C depict an aircraft 10 having a wing 12 with operating flaps 14. The flaps 14 are engaged to the wing 12 at multiple attachment points with underwing structures partially housed within fixed fairings 16a and movable fairings 16b. Extension of the flaps 14 to enhance aerodynamic performance during takeoff and landing is accomplished with a flap actuation system 17 causes the flaps 14 and movable fairings 16b to rotate downward relative to the wing 12 as seen in FIG. 1B.

Figure 2:
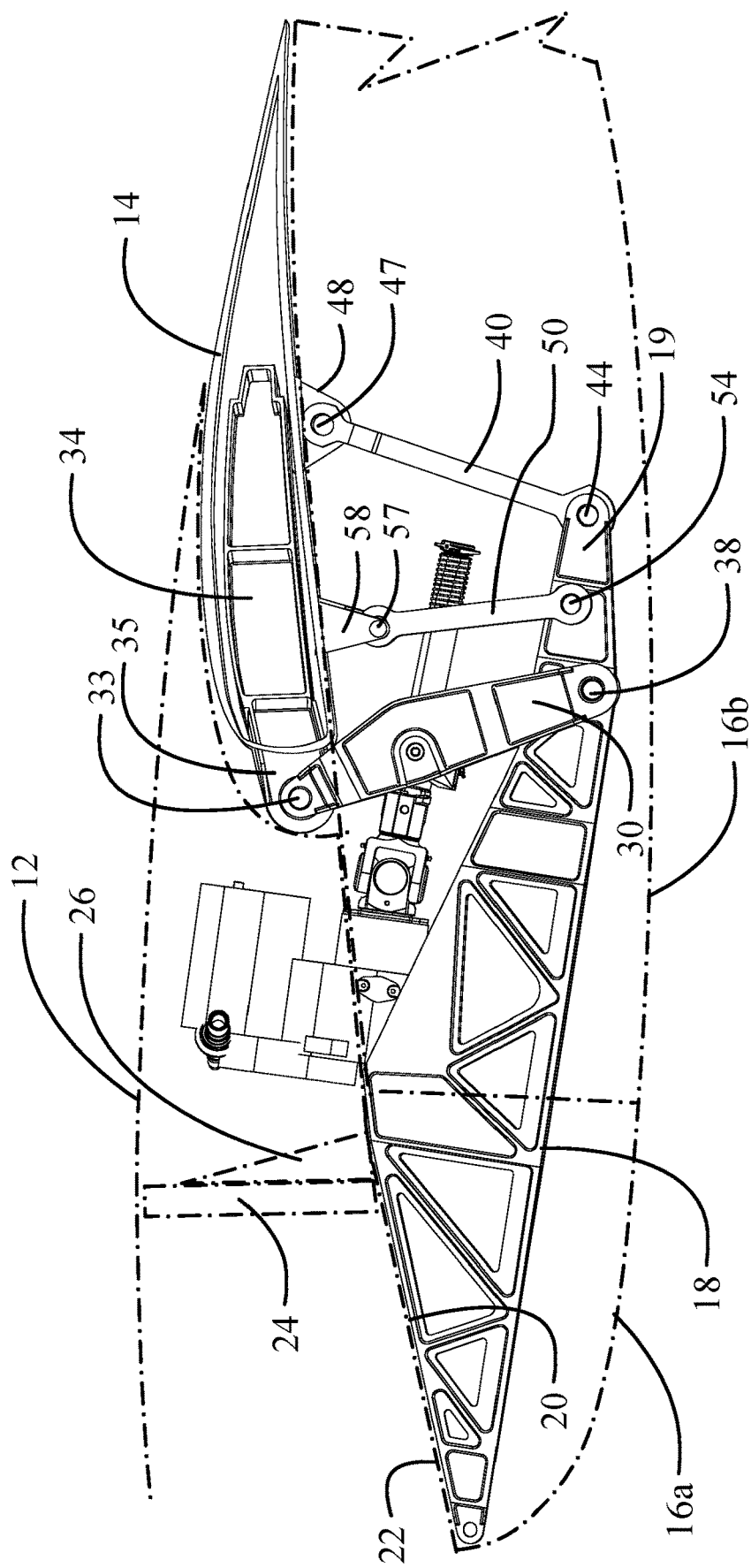
FIG. 2 is a side view of a first example implementation of the flap actuation system.

As seen in FIG. 2, at each attachment point a flap support element, an underwing beam (UWB) 18 for the example in the first implementation, provides fixed wing structure to attach the flaps 14 and associated operating support links and actuators (to be described in greater detail subsequently) to the wing 12. The UWB 18 is attached to the wing 12 on a lower surface 20 formed by a wing lower skin 22 and partially housed within the fixed fairing 16a. The movable fairing 16b encases the UWB18 and the flap actuation system 17 in the retracted position and rotates downward as the flap 14 is deployed. A rear spar 24 extends upward within the wing 12 from the wing lower skin 22 and the UWB 18 is attached to the rear spar with attachment brackets 26.

Figure 3:
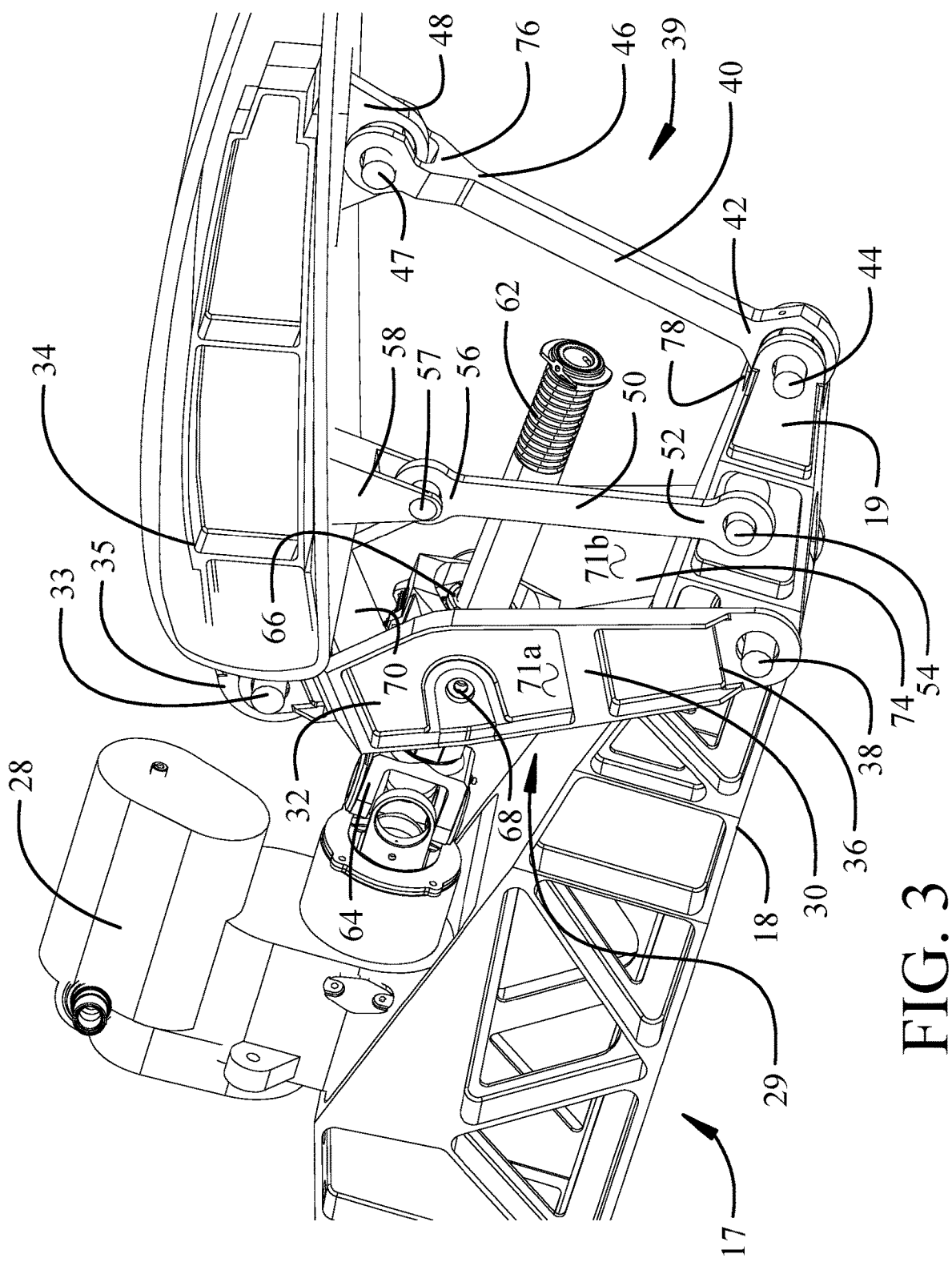
FIG. 3 is an aft pictorial detailed representation of the elements of the first implementation.

As seen in greater detail in FIG. 3 for a first example implementation, the flap 14 is deployed by drive assembly 29 having a flap drive link 30 with a first end 32 pivotally coupled with a drive axle 33 to a flap internal structure 34

(a one-piece/monolithic rib for the example shown in the drawings) with a forward lug 35. A second end 36 of the flap drive link 30 is pivotally coupled to the UWB 18 with a first pivot axle 38. A load reaction assembly 39 has a trailing link 40 with a leading end 42 (interpreted herein as positioned at a leading or forward end of the trailing link with respect to airflow over the wing and flap) pivotally coupled with a second pivot axle 44 proximate an aft end 19 of the UWB 18. A trailing end 46 (interpreted herein as positioned at a trailing or aft end of the trailing link with respect to airflow over the wing and flap) of the trailing link 40 is pivotally coupled with a reaction axle 47 to an aft fitting 48 on the flap internal structure 34. A catcher link 50 is pivotally attached at a bottom end 52 with a bottom pivot pin 54 to the UWB 18 and at a top end 56 with a top pivot pin 57 to an intermediate fitting 58 engaged to the flap internal structure 34. The catcher link 50 remains unloaded in a normal operating condition of the flap actuation system 17 throughout extension and retraction of the flap 14, as will be described in greater detail subsequently. A failure in the drive assembly 29, including the flap drive link 30, first pivot axle 38, drive axle 33 or forward lug 35, or the load reaction assembly 39, including the trailing link 40, second pivot axle 44, reaction axle 47 or aft fitting 48, induces a load on the catcher link 50 in the failure condition.

Figure 4A:
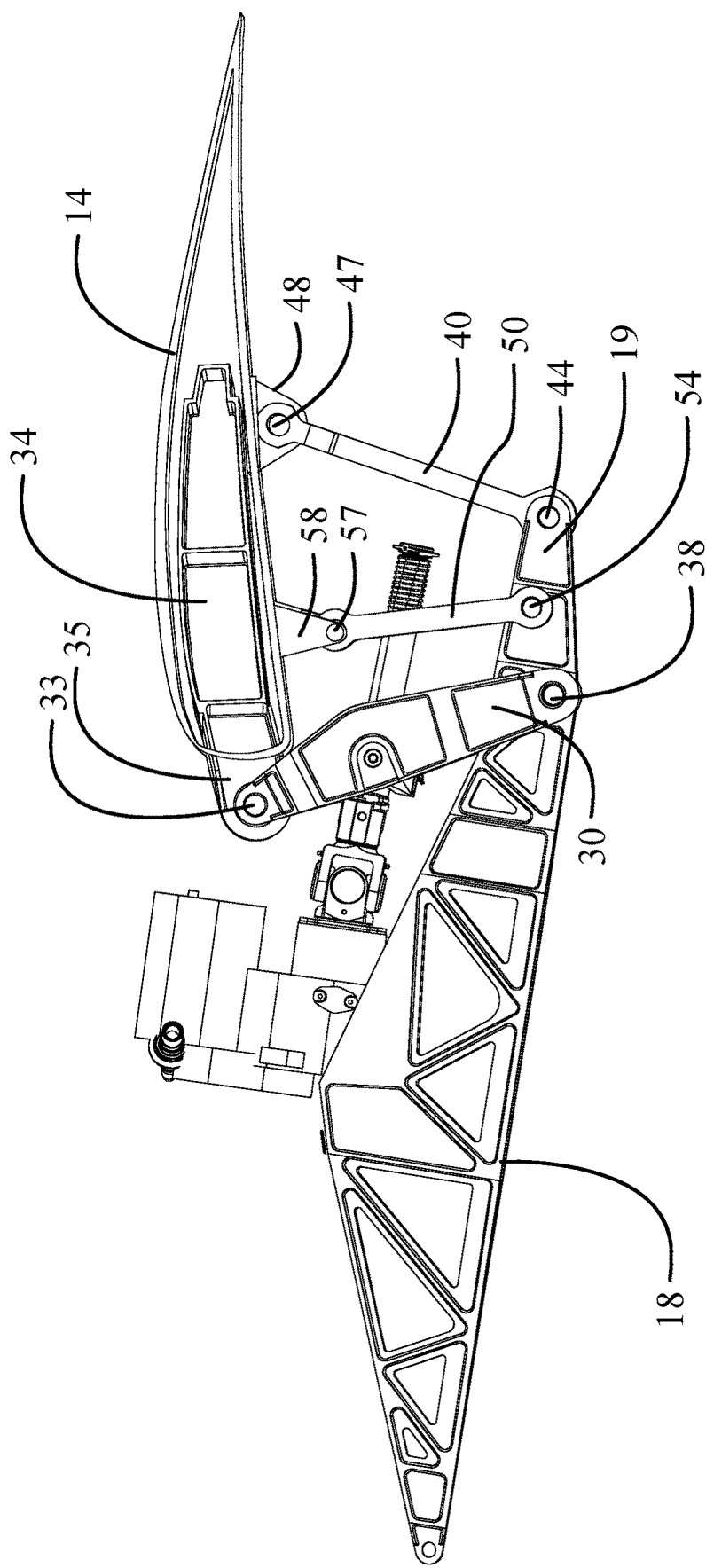
FIG. 4A is a side view of the first implementation with the flap in the retracted position.
Figure 4B:
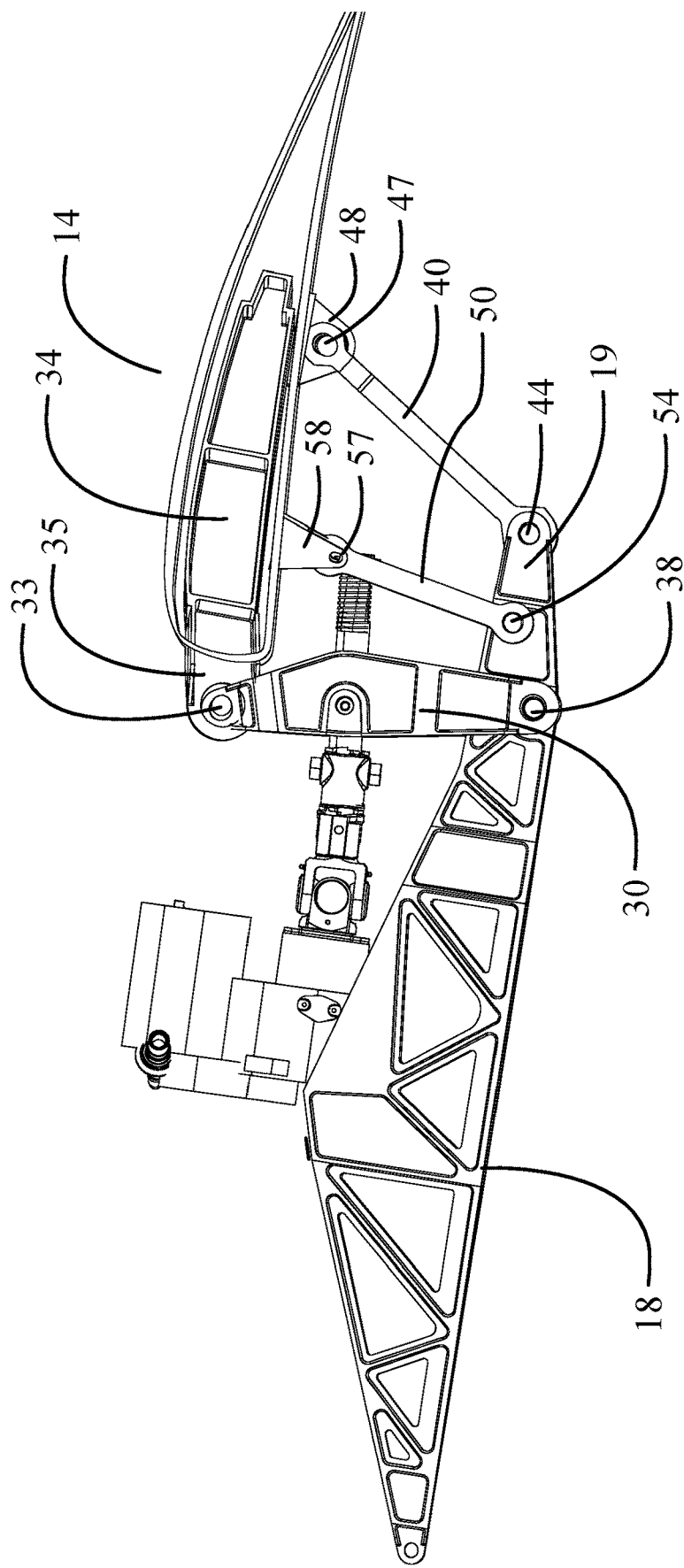
FIG. 4B a side view of the first implementation with the flap in the half-extended position.
Figure 4C:
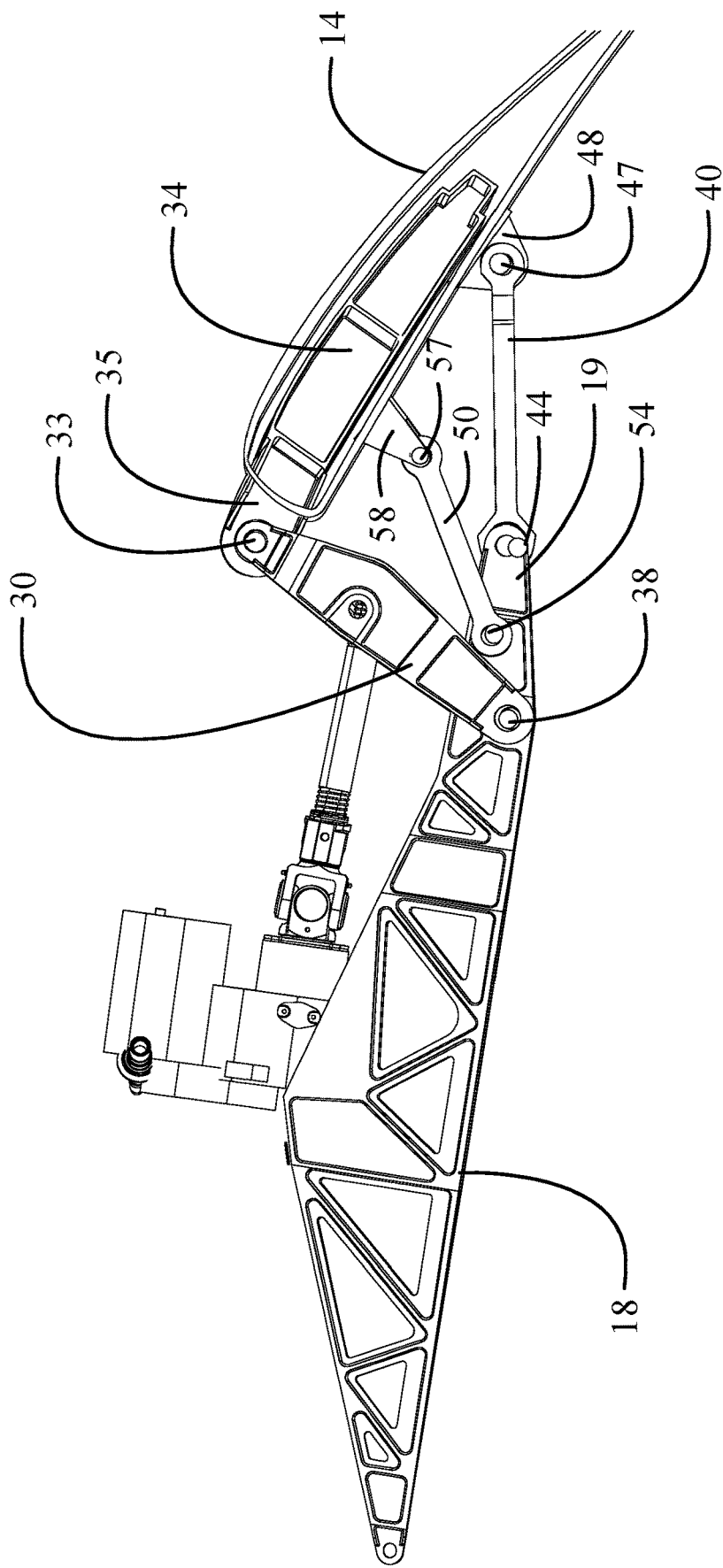
FIG. 4C a side view of the first implementation with the flap in the fully extended position

An actuator 28 is operably connected to rotate the flap drive link 30 about the first pivot axle 38 to move the flap 14 between a retracted position and a deployed or lowered position. FIG. 4A shows the flap 14 and flap actuation system 17 in the fully retracted position, FIG. 4B shows a partially extended position and FIG. 4C shows the fully extended position. In the example of the first implementation a drive shaft 62 is operably connected to the actuator 28 with a universal joint 64. For the exemplary implementation as shown, the flap drive link 30 has a spanning clevis 70 engaging the first pivot axle 38 on opposite sides of the UWB 18. Clevis 70 terminates at the first end 32 of the flap drive link 30. An aperture 74 in the clevis 70 receives the drive shaft 62 and the arms 71*a* and 71*b* of the clevis 70 pivotally support a ball nut 66 on pins 68 to operably engage the drive shaft 62. Similarly, the trailing end of the trailing link terminates in a trailing clevis 76 which engages the aft fitting and the reaction axle 47 rotatably constrains the aft fitting 48 in the trailing clevis. The UWB 18 terminates in an end clevis 78 which engages the leading end 42 of the trailing link 40 and the second pivot axle 44 constrains the trailing link in the end clevis.

The actuator 28, when actuated to deploy the flap 14, rotates the drive shaft 62 in a first direction through universal joint 64 causing translation of the ball nut 66 thereby urging rotation of the flap drive link 30 about the first pivot axle 38. The flap internal structure 34 urges the trailing end 46 of the trailing link 40 rearward causing the trailing link to rotate about the second pivot axle 44 drawing the flap 14 downward. Retracting the flap is accomplished by rotating the drive shaft 62 in a second direction.

Incorporation of the catcher link 50 allows the clevis 70 of the flap drive link 30 to be a monolithic element as opposed to prior implementations where fastened complimentary parts were required for failure redundancy. Similarly, the flap internal structure 34 of the flap 14 may be a monolithic rib as shown in the drawings. Additionally, the drive axle, first and second pivot axles and the reaction axle are single pin elements as opposed to pin-in-pin redundant elements previously required. The overall part count, with addition of the catcher link 50, bottom pivot pin 54, top pivot pin 57, and intermediate fitting 58, is reduced or remains constant with elimination of the pin-in-pin elements and complimentary parts requirements.

Figure 6:
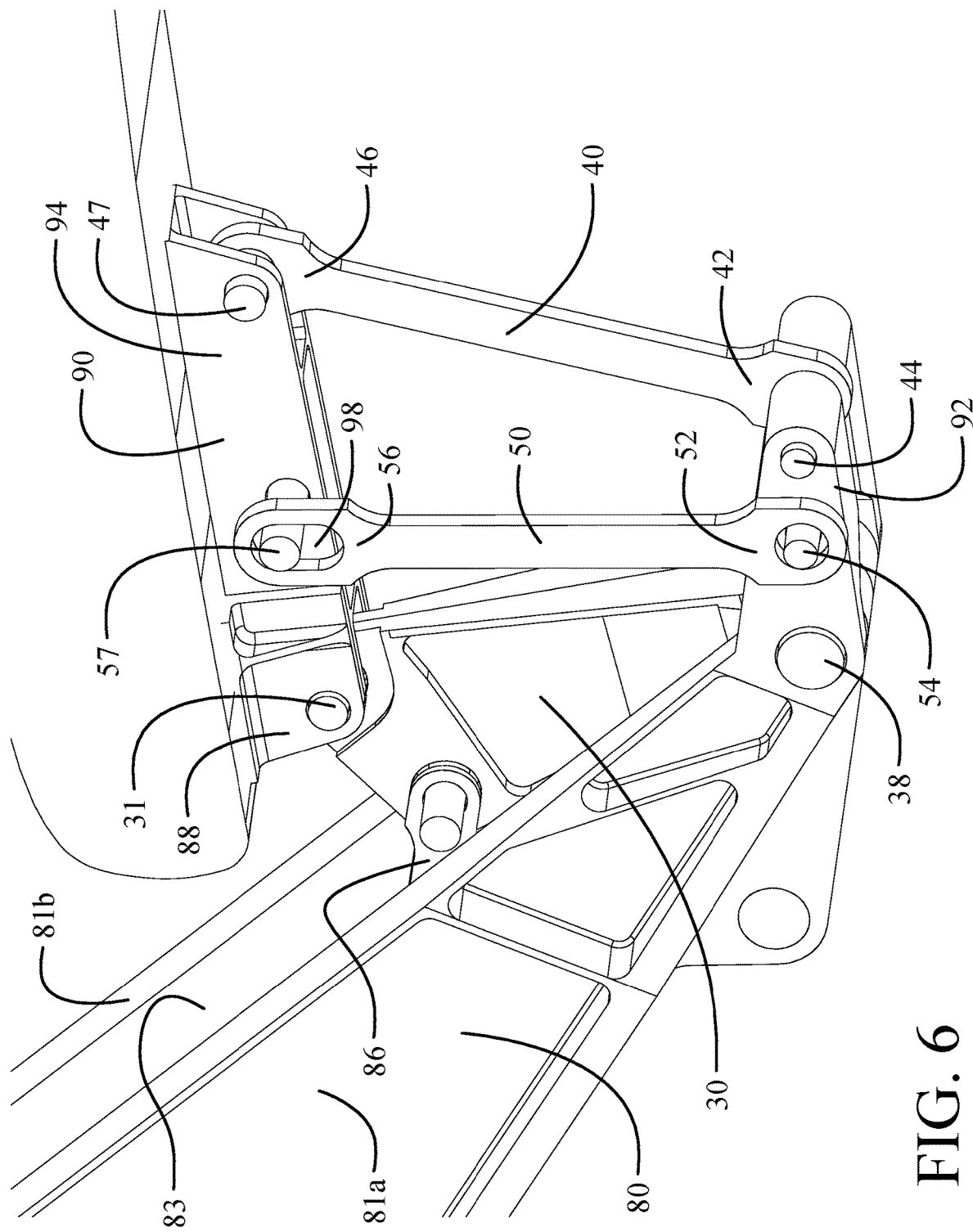
FIG. 6 is an aft pictorial detailed representation of the elements of the second implementation.

A second example implementation is shown in FIGS. 5 and 6. Elements common to the first implementation are similarly numbered. The flap actuation system 17 is supported by a connector beam 80 acting as the flap support element. A rotary actuator 82 has a rotating lever 84 engaging an actuating rod 86. The actuating rod 86 is attached to the flap drive link 30. Upon rotation of the rotating lever 84, actuating rod 86 urges rotation of the flap drive link 30 about a first pivot axle 38. Flap drive link 30 urges the drive axle 31, engaged to a forward lug 88 of a flap attachment structure 90, and flap 14 aft with a first rotational direction of the actuator and forward with a second rotational direction of the actuator. Unlike the first implementation, the connector beam 80 has two ribs 81*a* and 81*b* forming an aperture 83 through which the actuating rod 86 extends. The flap drive link 30 is received between the ribs 81*a* and 81*b*. As in the first implementation, the trailing link 40 has a leading end 42 pivotally coupled with a second pivot axle 44 proximate an aft end 92 of the connector beam 80. A trailing end 46 of the trailing link 40 is pivotally coupled with a reaction axle 47 to an aft portion 94 on the flap attachment structure 90. As in the first implementation, a catcher link 50 is pivotally attached at a bottom end 52 with a bottom pivot pin 54 to the connector beam 80 and at a top end 56 with a top pivot pin 57 to an intermediate portion 96 of the flap attachment structure 90. In the second implementation as shown in FIG. 6 (with axle and pivot pin caps removed and tolerances expanded for clarity), catcher link 50 incorporates a slotted aperture 98 in top end 56 to receive the top pivot pin 57 to provide tolerance for limited relative translation of the catcher link and the top pivot pin, which assures that the catcher link remains unloaded in a typical operating condition of the flap actuation system 17 throughout extension and retraction of the flap 14. In alternative implementations, the slotted aperture may be incorporated in the bottom end 52 to receive the bottom pivot pin 54 to provide tolerance for limited translation between the catcher link and the bottom pivot pin.

Figure 7A:
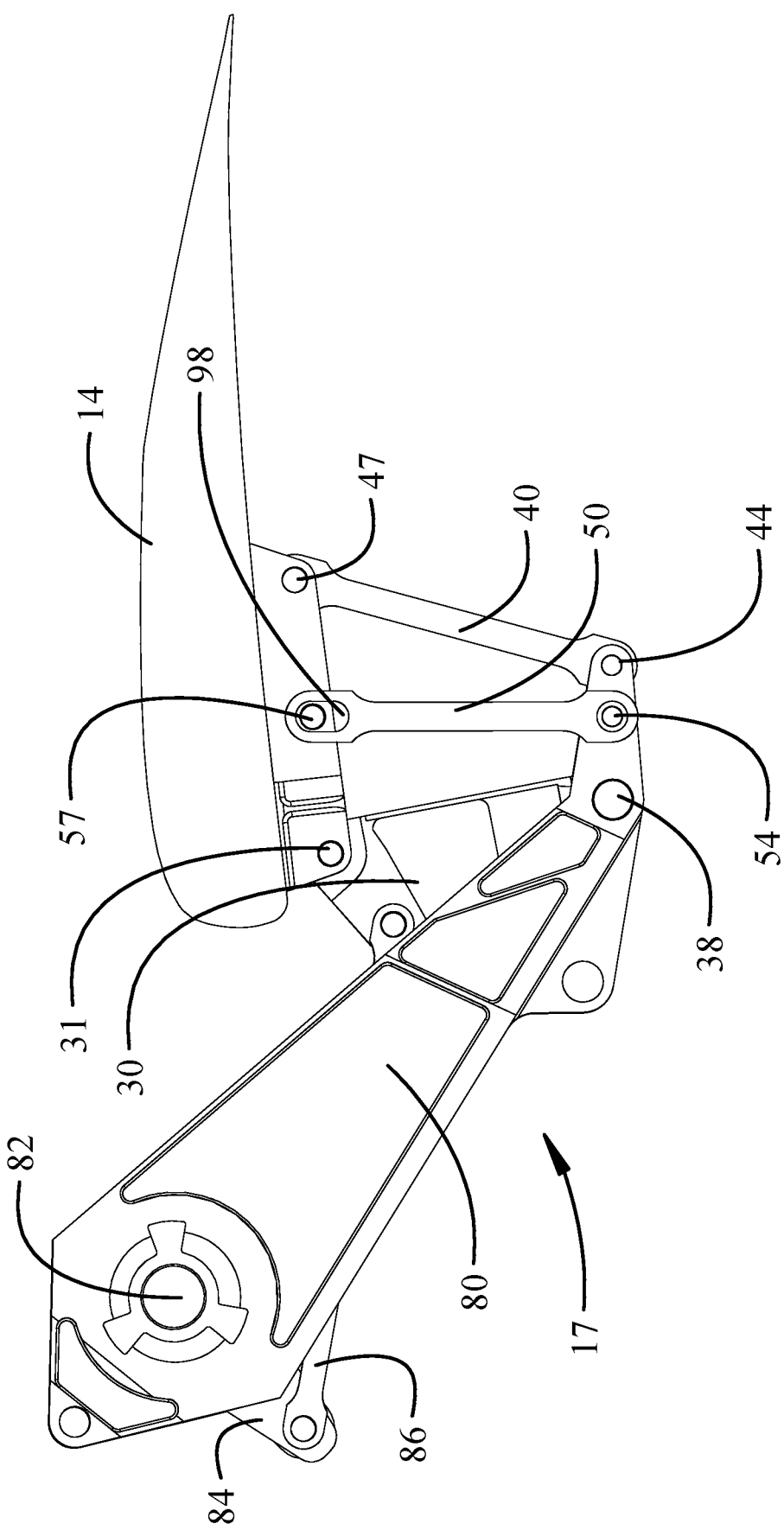
FIG. 7A is a side view of the second implementation with the flap in the retracted position.
Figure 7B:
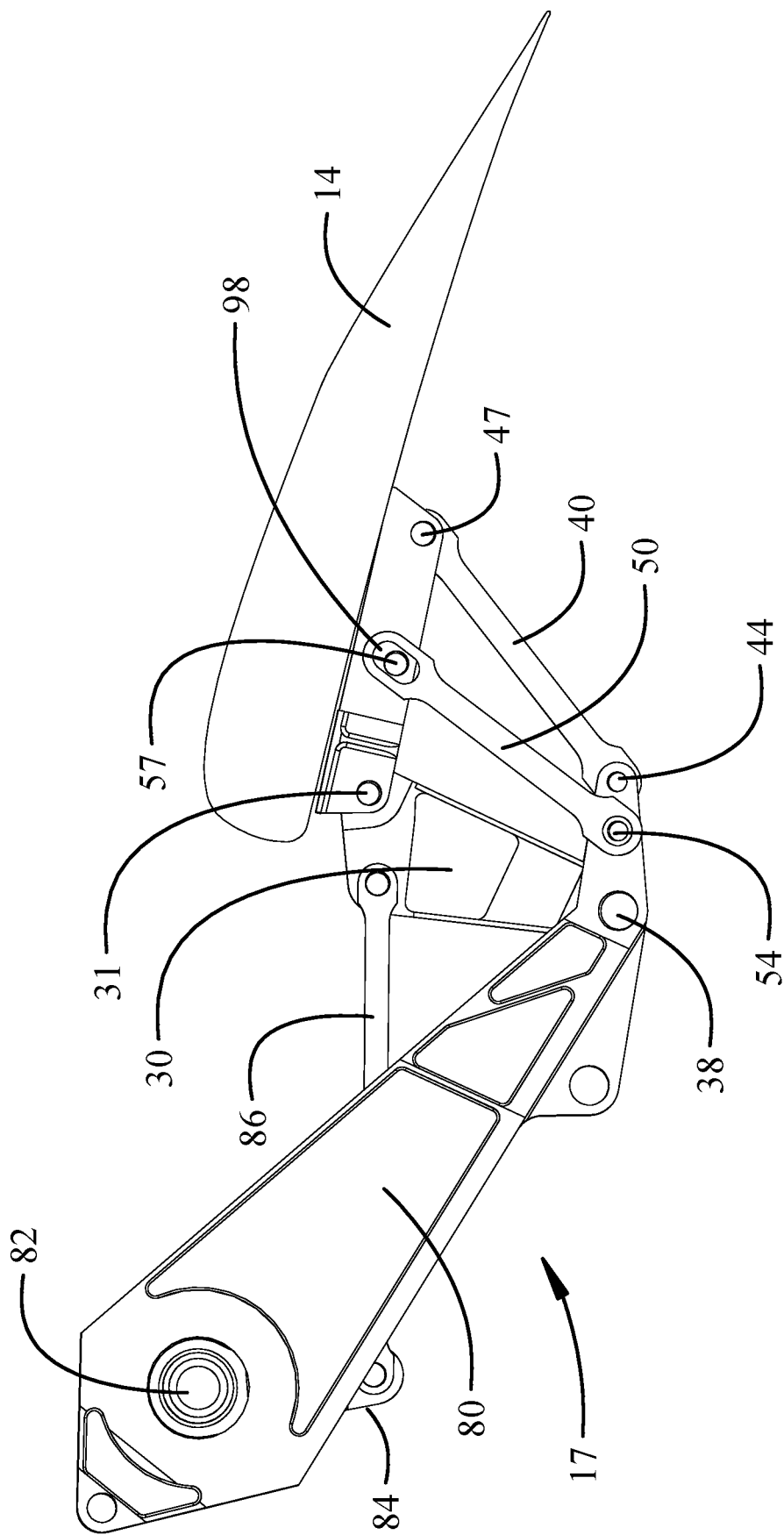
FIG. 7B a side view of the second implementation with the flap in the half-extended position.
Figure 7C:
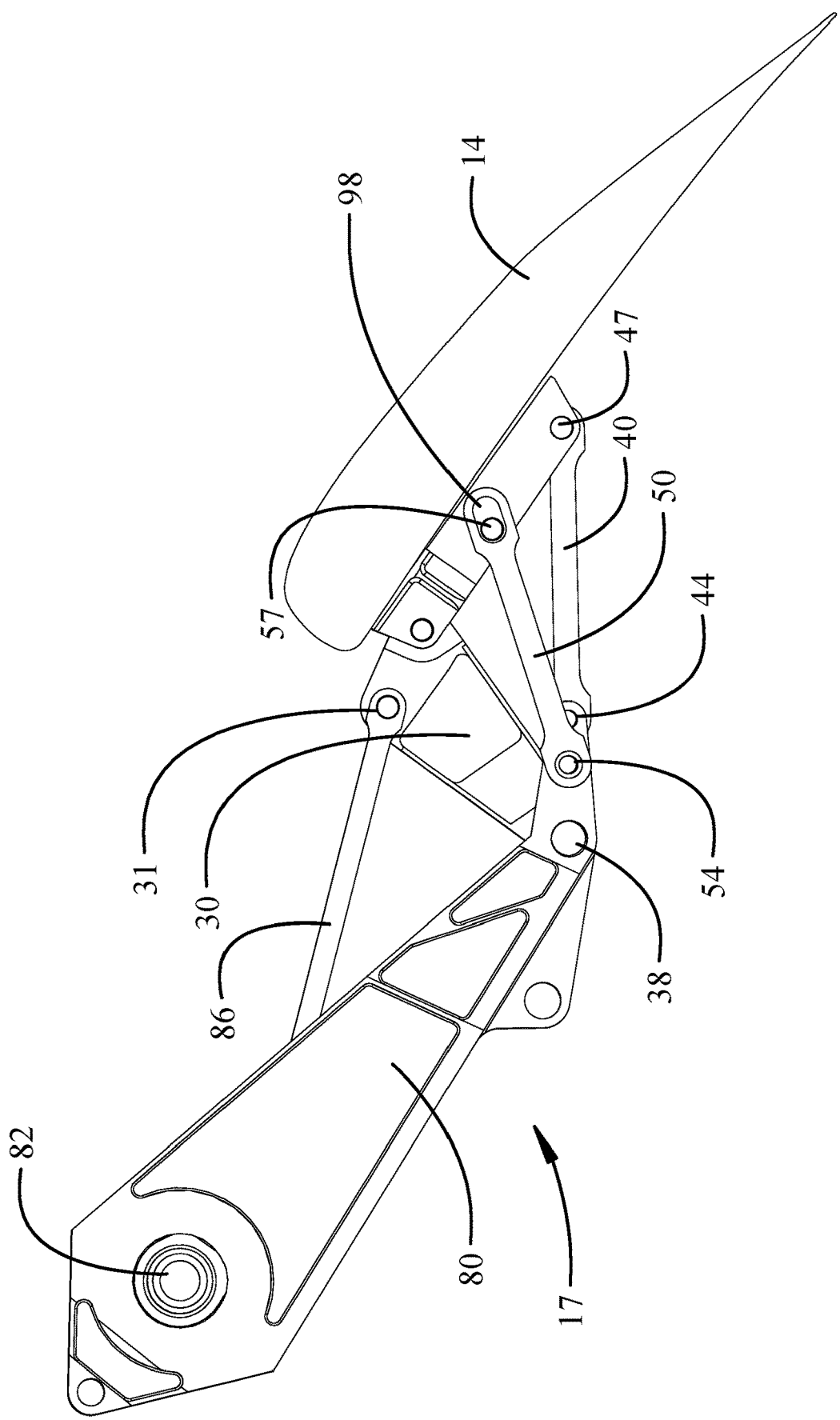
FIG. 7C a side view of the second implementation with the flap in the fully extended position
Figure 8:
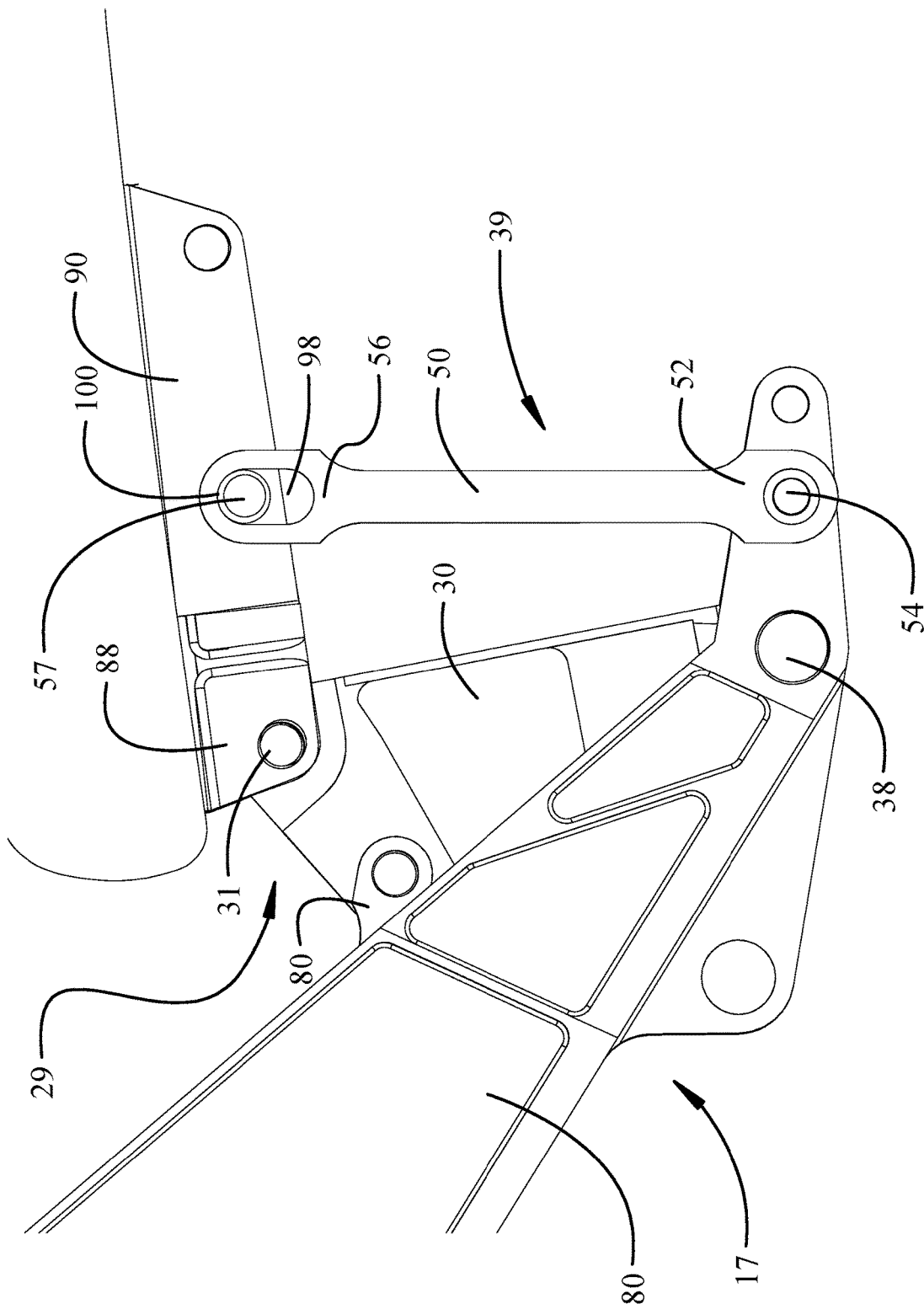
FIG. 8 is a side view of the second implementation with an example failure shown by removal of the trailing link.

As seen in FIGS. 7A-7C, operation of the flap actuation system 17 extending the flap 14 from the fully retracted position in FIG. 7A to an intermediate deployed position in FIG. 7B and fully deployed in FIG. 7C, top pivot pin 57 translates in the slotted aperture 98 and no load is imposed on the catcher link 50 during typical operation. However upon a failure in the drive assembly 29 of any of the flap drive link 30 , first pivot axle 38, drive axle 31, forward lug 88 or in the load reaction assembly 39 including any of the trailing link 40, second pivot axle 44, reaction axle 47 or aft portion 94, as exemplified in FIG. 8 showing removal of the trailing link simulating a failure, results in translation of the top pivot pin in the slotted aperture to engage an upper termination 100 of the slotted aperture inducing a load on the catcher link. The catcher link 50 then compensates by carrying the load for the failed element, to mitigate the failure.

Figure 9:
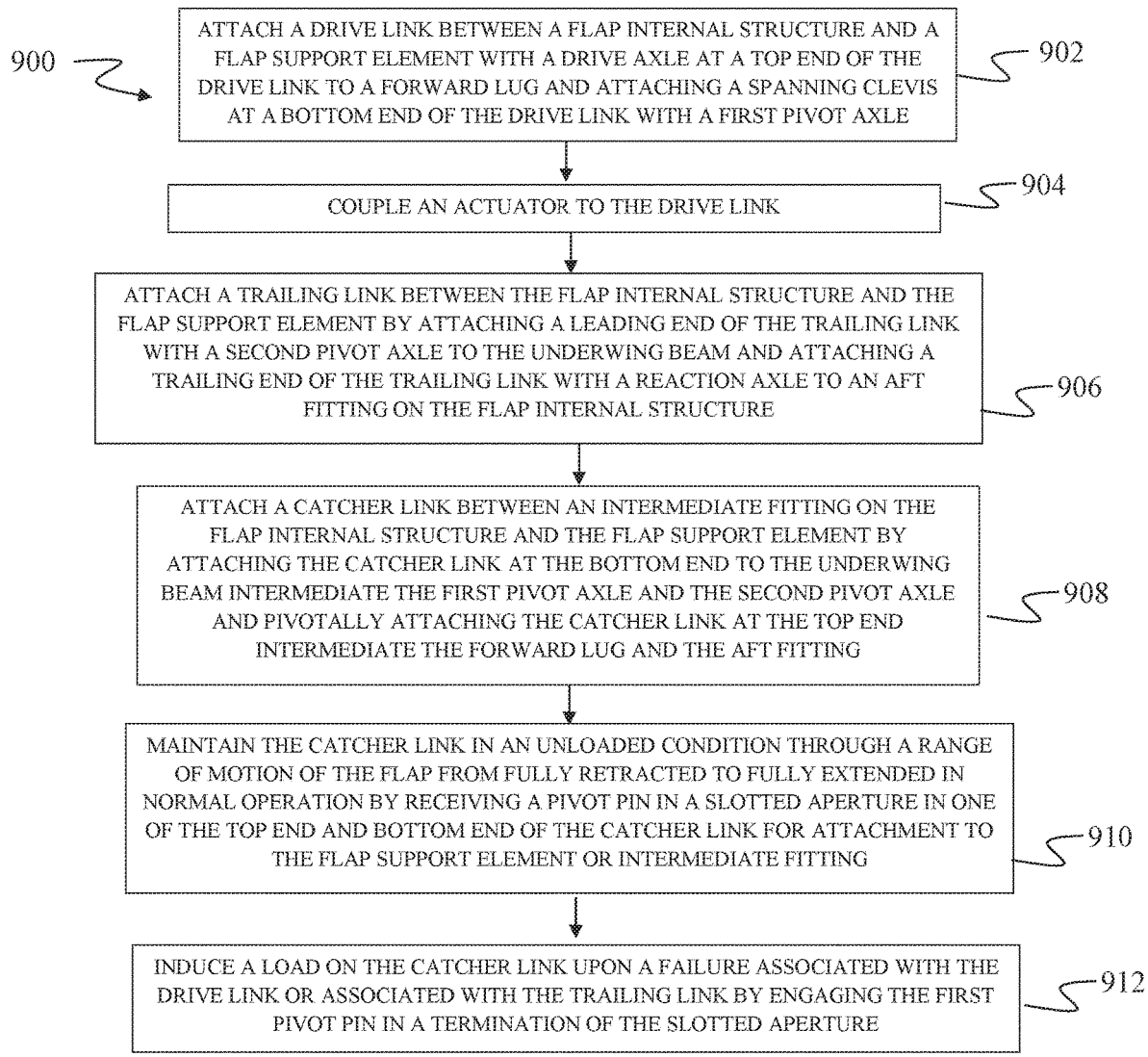
FIG. 9 is a flow chart of a method for flap deployment and backup loading of the catcher link using the exemplary implementations.

The implementations disclosed herein provide a method 900 for mitigating a failure in a flap actuation mechanism 17 as shown in FIG. 9. A flap drive link 30 is attached between a flap internal structure 34 and a flap support element such as an underwing beam 18 by pivotally attaching the drive link with a single pin drive axle 31 at a top end to a forward lug on the flap internal structure, and pivotally attaching a spanning clevis at a bottom end of the drive link with a single pin first pivot axle to the underwing beam, step 902. An actuator is coupled to the drive link, step 904. A trailing link is attached to the underwing beam and the flap internal structure by pivotally attaching a leading end of the trailing link with a single pin second pivot axle to the underwing beam and pivotally attaching a trailing end of the trailing link with a single pin reaction axle to an aft fitting on the flap internal structure, step 906. A catcher link is attached at a bottom end to the underwing beam and at a top end to an intermediate fitting engaged to the flap internal structure by pivotally attaching the catcher link at the bottom end to the underwing beam intermediate the single pin first pivot axle and the single pin second pivot axle and pivotally attaching the catcher link at the top end intermediate the forward lug and the aft fitting, step 908. One of the top end and the bottom end of the catcher link may have a slotted aperture 98 receiving a pivot pin for pivotal attachment to the underwing beam or the intermediate fitting, thereby maintaining the catcher link unloaded through a range of motion of the flap from fully retracted to fully extended in the typical operating condition, step 910. Upon a failure associated with the drive link, such as failure of the drive link itself, first pivot axle, drive axle or forward lug, or associated with the trailing link, such as a failure of the trailing link itself, second pivot axle, reaction axle or aft fitting, a load is induced on the catcher link for failure mitigation, step 912. Inducing the load in the catcher link 50, in exemplary implementations, is accomplished by engaging the top pivot pin 57 in a termination of the slotted aperture in a failure condition caused by a failure associated with the drive link or the trailing link.

Having now described various examples of the disclosure in detail as required by the patent statutes, those skilled in the art will recognize modifications and substitutions to the specific examples disclosed herein. Such modifications are within the scope and intent of the present disclosure as defined in the following claims.

What is claimed is:

1. An aircraft wing comprising:
   a flap having a flap internal structure;
   a drive link pivotally attached at a top end with a drive axle to a forward lug on the flap internal structure and pivotally attached at a bottom end with a first pivot axle to a flap support element;
   an actuator operably coupled to the drive link, intermediate the top end and bottom end;
   a trailing link pivotally attached, at a leading end with a second pivot axle, to the flap support element and pivotally attached, at a trailing end with a reaction axle, to an aft fitting on the flap internal structure; and
   a catcher link pivotally attached at a bottom end to the flap support element and at a top end to an intermediate fitting engaged to the flap internal structure, said catcher link unloaded in an operating condition and wherein a failure in at least one of the drive link, first pivot axle, drive axle, forward lug, trailing link, second pivot axle, reaction axle and aft fitting induces a load on the catcher link.

2. The aircraft wing as defined in claim 1, wherein one of the bottom end and top end of the catcher link has a longitudinal slot to receive a pivot pin for pivotal attachment to the flap support element or the intermediate fitting, respectively, thereby preventing loading of the catcher link through a range of motion of the flap including fully retracted and fully extended in the operating condition, said pivot pin engaged in a termination of the longitudinal slot upon said failure to induce the load on the catcher link.

3. The aircraft wing as defined in claim 2, wherein a bottom pivot pin pivotally engages the bottom end of the catcher link to the flap support element, intermediate the first pivot axle and the second pivot axle.

4. The aircraft wing as defined in claim 1, wherein the drive link is monolithic.

5. The aircraft wing as defined in claim 1, wherein the first pivot axle is a single pin.

6. The aircraft wing as defined in claim 1, wherein the drive axle is a single pin.

7. The aircraft wing as defined in claim 1, wherein the flap support element comprises an underwing beam and the bottom end of the drive link comprises a spanning clevis engaging the first pivot axle on opposite sides of the underwing beam.

8. The aircraft wing as defined in claim 7, wherein the actuator has a drive shaft extending through an aperture in the spanning clevis.

9. The aircraft wing as defined in claim 1, wherein the flap support element comprises a connector beam and the actuator has a rotating lever engaging an actuating rod, said actuating rod attached to the drive link.

10. The aircraft wing as defined in claim 1, wherein the flap support element comprises an underwing beam and said underwing beam terminates in an end clevis and the second pivot axle pivotally constrains the trailing link in the end clevis.

11. The aircraft wing as defined in claim 10, wherein the second pivot axle is a single pin.

12. The aircraft wing as defined in claim 1, wherein the trailing end of the trailing link terminates in a trailing clevis and the reaction axle pivotally connects the aft fitting to the trailing clevis.

13. The aircraft wing as defined in claim 12, wherein the reaction axle is a single pin.

14. The aircraft wing as defined in claim 1, wherein the flap internal structure comprises a monolithic rib.

15. A method for mitigating a failure in a flap actuation structure, the method comprising:
    attaching a drive link between a flap internal structure and a flap support element;
    coupling an actuator to the drive link;
    attaching a trailing link to the flap support element and the flap internal structure;
    attaching a catcher link at a bottom end to the flap support element and at a top end to an intermediate fitting engaged to the flap internal structure;
    maintaining said catcher link unloaded in an operating condition; and
    in response to a failure associated with the drive link or the trailing link, inducing a load on the catcher link for failure mitigation.

16. The method as defined in claim 15, wherein one of the bottom end and the top end of the catcher link has a longitudinal slot receiving a pivot pin for pivotal attachment to the flap support element or the intermediate fitting, respectively, thereby maintaining the catcher link unloaded through a range of motion of the flap including fully retracted and fully extended in the typical operating condition.

17. The method as defined in claim 16, further comprising engaging said pivot pin in a termination of the longitudinal slot in a failure condition caused by a failure associated with the drive link or the trailing link, thereby inducing the load on the catcher link.

18. The method as defined in claim 17, wherein a step of attaching the drive link comprises:

pivotally attaching the drive link, with a single pin drive axle at a top end, to a forward lug on the flap internal structure; and pivotally attaching a spanning clevis, at a bottom end of the drive link with a single pin first pivot axle, to the flap support element.

19. The method as defined in claim 18, wherein a step of attaching the trailing link comprises:

pivotally attaching a leading end of the trailing link, with a single pin second pivot axle, to the flap support element; and pivotally attaching a trailing end of the trailing link, with a single pin reaction axle, to an aft fitting on the flap internal structure.

20. The method as defined in claim 19, wherein a step of attaching the catcher link further comprises:

pivotally attaching the catcher link at the bottom end to the flap support element, intermediate the single pin first pivot axle and the single pin second pivot axle; and pivotally attaching the catcher link at the top end, intermediate the forward lug and the aft fitting.

* * * * *